United States Patent [19]
Bachelor

[11] Patent Number: 6,135,565
[45] Date of Patent: Oct. 24, 2000

[54] ROTARY TAILGATE LATCH OPERATING SYSTEM

[75] Inventor: Dean L. Bachelor, Petoskey, Mich.

[73] Assignee: Hyde Equipment Company, Petoskey, Mich.

[21] Appl. No.: 09/049,338

[22] Filed: Mar. 27, 1998

[51] Int. Cl.[7] ........................................... B60P 1/00
[52] U.S. Cl. ....................................................... 298/23 M
[58] Field of Search ............................. 298/22 R, 23 M; 296/56; 292/267, 274, 298

[56] References Cited

U.S. PATENT DOCUMENTS

| | | |
|---|---|---|
| 2,220,202 | 11/1940 | Bohne . |
| 2,237,838 | 4/1941 | McClish ................................ 298/23 M |
| 2,856,233 | 10/1958 | Boyce et al. ......................... 298/23 M |
| 3,721,469 | 3/1973 | Senesac et al. . |
| 3,811,729 | 5/1974 | Vornberger . |
| 3,860,288 | 1/1975 | Martin et al. . |
| 4,109,963 | 8/1978 | Sieving et al. . |
| 4,307,541 | 12/1981 | Farmer et al. . |
| 5,092,656 | 3/1992 | Eldridge . |
| 5,143,496 | 9/1992 | Smith et al. . |
| 5,197,782 | 3/1993 | May et al. . |

FOREIGN PATENT DOCUMENTS

| | | | |
|---|---|---|---|
| 213520 | 1/1957 | Australia ........................... | 298/23 M |

*Primary Examiner*—Stephen T. Gordon
*Attorney, Agent, or Firm*—Nixon Peabody LLP

[57] ABSTRACT

A vehicle with a rotary tailgate latch operating system in accordance with one embodiment in the present invention includes a longitudinally extending vehicle frame having a pair of opposing longitudinal ends, a vehicle body having a tailgate opening, a tailgate having an upper end and a lower end, at least one latching mechanism connected to the body adjacent to the lower end of the tailgate, a lift cylinder for raising and lowering the vehicle body, a rotary actuator, and a fluid operating control system. The vehicle body is pivotally mounted to the vehicle frame adjacent one of the longitudinal ends. The upper end of the tailgate is pivotally connected to the vehicle body in the tailgate opening. The latching mechanism has a first position which secures the lower end of the tailgate adjacent to the body and a second position which releases the lower end of the tailgate. The lift cylinder has a pair of opposing ends with one of the ends of the lift cylinder connected to the vehicle frame and the other end of the lift cylinder connected to the vehicle body. The rotary actuator is connected to the latching mechanism for rotating the latching mechanism between the first and second positions. The rotary actuator extends in a substantially lateral direction with respect to the longitudinally extending vehicle frame. The fluid operating control system is connected to operate both the lift cylinder and the rotary actuator.

21 Claims, 8 Drawing Sheets

ROTARY TAILGATE LATCH OPERATING SYSTEM

FIELD OF INVENTION

This invention relates generally to vehicles with pivotally connected tailgates, and more particularly, to a rotary tailgate latch operating system for controlling when a pivotally connected tailgate on a vehicle is released or secured.

BACKGROUND OF THE INVENTION

Many vehicles, such as dump trucks, have a dump body with a tailgate pivotally attached at an upper end to the dump body in a tailgate opening. Depending upon the particular operation, the lower end of the tailgate may need to be either released from or secured against the vehicle body. A variety of different types of devices have been designed to be able to release and secure the lower end of a tailgate against the vehicle body, but each of these designs have problems.

For example, one type of prior apparatus includes a longitudinally extending hydraulic cylinder which is connected to a latching mechanism on each side of the vehicle body. When engaged, a piston in each of the hydraulic cylinders is either driven out or is pulled in along a longitudinal direction to pivot the latching mechanism connected to the hydraulic cylinder between a position releasing the lower end of the tailgate and a position securing the lower end of the tailgate against the vehicle body. Some examples of this type of device are set forth in U.S. Pat. No. 2,220,202 to Bohn, U.S. Pat. No. 3,811,729 to Vornberger, and U.S. Pat. No. 3,860,288 to Martin et al., which are all herein incorporated by reference. One of the problems with this apparatus is that a separate actuator is required to control the latching mechanism on each side of the vehicle body. This adds to the complexity and cost of the apparatus. This apparatus may experience problems in synchronizing the latching mechanisms on each side to release from or secure against the lower end of the tailgate against dump body at the same time because two actuators are used. As a result, one side of the lower end of the tailgate may not be released in time thus holding the tailgate in a secured position longer than desired or one side of the lower end of the tailgate may not be secured permitting materials in the dump body to seep out on that side. If the dump body only has one latching mechanism, then the tailgate will not be securely held against the vehicle body. Another problem with these devices is that the hydraulic cylinders used to operate the latching mechanism have high maintenance costs because the pistons are repeatedly exposed to contaminants, such as dirt.

Another similar apparatus also includes a longitudinally extending hydraulic cylinder which is connected to a latching mechanism on each side of the vehicle body. The apparatus also includes a latch position sensor on each side which monitors the state of the latching mechanisms, i.e. latched or unlatched, a hoist controller which can lower, hold and raise the vehicle body, and hoist lock which can prevent the hoist controller from raising the vehicle body. If the latch position sensors sense that the latching mechanisms are latched, then the hoist lock prevents the hoist controller from raising the dump body until the latching mechanisms are unlatched. One example of this type of device is set forth in U.S. Pat. No. 4,109,963 to Sieving et al. which are herein incorporated by reference. Again, one of the problems with this type of apparatus is that a separate actuator and a separate latch position sensor is required on each side of the vehicle body. This adds to the complexity and cost of this type of apparatus. If the dump body only has one latching mechanism, then the tailgate will not be securely held against the vehicle body. Another problem is that the hydraulic cylinders used to operate the latching mechanism have high maintenance costs because the pistons are repeatedly exposed to contaminants, such as dirt. Further, this apparatus requires a complicated and costly monitoring and locking system to prevent the dump body from being raised with the tailgate in a latched position.

Another apparatus incorporates a hydraulic cylinder on each side of the body which extends in the vertical direction with respect to the longitudinally extending truck frame and body. One end of each hydraulic cylinder is connected to a latching mechanism on each side of the dump body and the other end of each hydraulic cylinder is connected to the tailgate. When the hydraulic cylinder is engaged, each of the hydraulic cylinders is initially pushed in a downward direction which pivots the latching mechanisms to release and then stops. Meanwhile, a piston in the other end of the hydraulic cylinder continues to extend in a generally upward direction to raise the tailgate. Some examples of these types of devices are set forth in U.S. Pat. No. 3,860,288 to Norton et al. and U.S. Pat. No. 4,307,541 to Farmer et al. which are herein incorporated by reference. Again, one of the problems with this type of apparatus is that a separate actuator is required to control the latching mechanism or each side of the dump body. This adds to the complexity and cost of this type of apparatus. If the dump body only has one latching mechanism, then the tailgate will not be securely held against the vehicle body. Another problem is that the hydraulic cylinders used to operate the latching mechanism have high maintenance costs because the pistons are repeatedly exposed to contaminants.

Another apparatus includes a latch connected at one end of a lever arm which is connected to the upper end of a tailgate. A latch and lever arm are located on each side of the truck. A cable on each side is connected at one end to the latch on that side and at the other end to the truck frame. As the dump body is raised, the latches are disengaged by the cables and the lever arms are pivoted to raise the tailgate. One example of this type of device is set forth in U.S. Pat. No. 5,092,656 to Eldridge which is herein incorporated by reference. One of the problems with this apparatus is that the latches are located at the upper end of the tailgate. As a result, the lower end of the tailgate is not tightly secured and material may seep out of the dump body. Additionally, another problem is that a separate actuator is required to control the operation of the latches on each side of the dump body. This adds to the complexity and cost of this apparatus.

SUMMARY OF THE INVENTION

A vehicle with a rotary tailgate latch operating system in accordance with one embodiment in the present invention includes a longitudinally extending vehicle frame having a pair of opposing longitudinal ends, a vehicle body having a tailgate opening, a tailgate having an upper end and a lower end, at least one latching mechanism connected to the vehicle body adjacent to the lower end of the tailgate, a lift cylinder for raising and lowering the vehicle body, a rotary actuator, and a fluid operating control system. The vehicle body is pivotally mounted to the vehicle frame adjacent one of the longitudinal ends. The upper end of the tailgate is pivotally connected to the dump body in the tailgate opening. The latching mechanism has a first position which secures the lower end of the tailgate adjacent to the body and a second position which releases the lower end of the tailgate. The lift cylinder has a pair of opposing ends with one of the ends of the lift cylinder connected to the vehicle frame and the other end of the lift cylinder connected to the vehicle body. The rotary actuator is connected to the latching mechanism for rotating the latching mechanism between the first and second positions. The rotary actuator extends in a substantially lateral direction with respect to the longitudinally extending vehicle frame. The fluid operating control system is connected to operate both the lift cylinder and the rotary actuator.

A vehicle with a rotary tailgate latch operating system in accordance with another embodiment in the present invention includes a longitudinally extending vehicle frame having a pair of opposing longitudinal ends, a vehicle body having a tailgate opening, a tailgate having an upper end and a lower end, a pair of latching mechanism connected to each side of the body adjacent to the lower end of the tailgate, a single actuator, and a fluid operating control system. The vehicle body is pivotally mounted to the vehicle frame adjacent one of the longitudinal ends. The upper end of the tailgate is pivotally connected to the vehicle body in the tailgate opening. Each of the latching mechanisms has a first position which secures that side of the lower end of the tailgate adjacent to the body and a second position which releases that side of the lower end of the tailgate. The single actuator is connected to both of the latching mechanisms for simultaneously moving each of the latching mechanisms between the first and second positions. The fluid operating control system is connected to operate the single actuator.

A tailgate latching control system in accordance with another embodiment in the present invention for a vehicle with a longitudinally extending vehicle frame having a pair of opposing longitudinal ends, a vehicle body having a tailgate opening, the vehicle body pivotally mounted to the frame adjacent one of the longitudinal ends, a tailgate having an upper end and a lower end, the upper end of the tailgate pivotally connected to the vehicle body in the tailgate opening includes at least one latching mechanism and a rotary actuator. The latching mechanism is connected to the body adjacent to the lower end of the tailgate and has a first position which secures the lower end of the tailgate adjacent to the body and a second position which releases the lower end of the tailgate. The rotary actuator is connected to the latching mechanism and extends in a substantially lateral direction with respect to the longitudinally extending vehicle frame. The rotary actuator rotates the latching mechanism between the first and second positions when engaged.

The rotary tailgate latch operating system provides a number of advantages including providing a simplified and less expensive automated design for controlling when the lower end of a tailgate is secured and released. Unlike prior systems, with the present invention a single actuator is used to control the latching mechanisms on both sides of the tailgate. Not only is this design much simpler, but this design is better able to synchronize when the latching mechanisms on each side release from or secure against the lower end of the tailgate. As a result, both sides of the lower end of the tailgate will be released when they need to be released and both sides will be secured when they need to be secured.

Additionally, one embodiment of the present invention is further able to simply the design over prior systems by utilizing the same fluid operating control system which is used to control the lift cylinder to control the operating of the latching mechanism. As a result, the latching mechanism can be easily and simply controlled to unlatch the latching mechanism whenever the dump body is raised and to latch the latching mechanism when the dump body is lowered to the vehicle frame. Further, the present invention can incorporate an override switch so that, if desired, the latching mechanism can remain latched to secure the lower end of the tailgate against the dump body even when the dump body is raised by the lift cylinder.

Yet another advantage of the present invention is that it utilizes a rotary actuator to control the operation of the latching mechanisms, instead of using hydraulic cylinders which have higher maintenance costs.

DETAILED DESCRIPTION

Figure 1A:
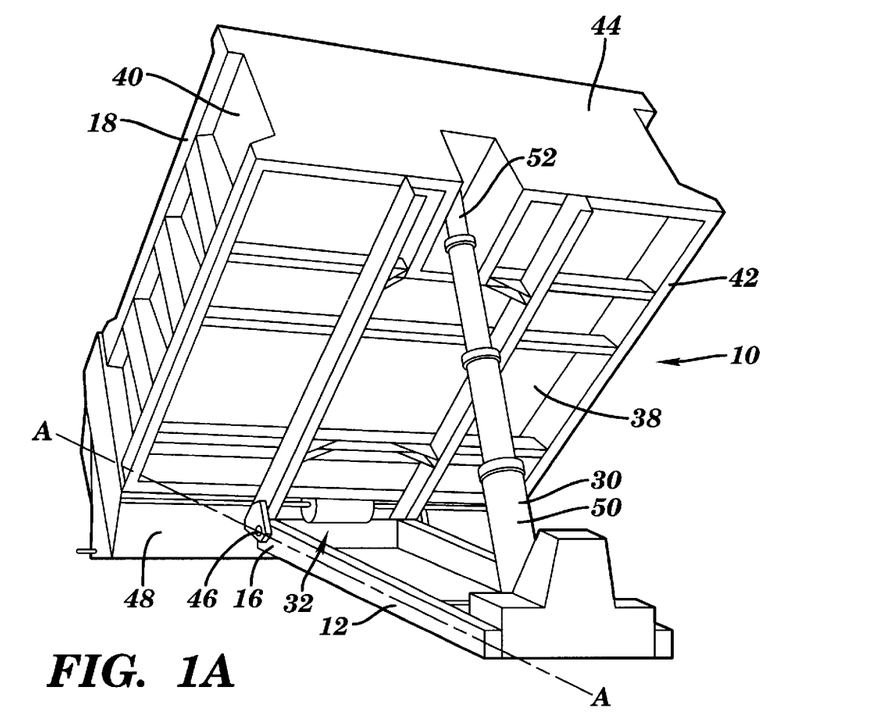
FIG. 1A is a perspective view of an automatic rotary tailgate latch operating system on a dump truck body in accordance with one embodiment of the present invention.
Figure 1B:
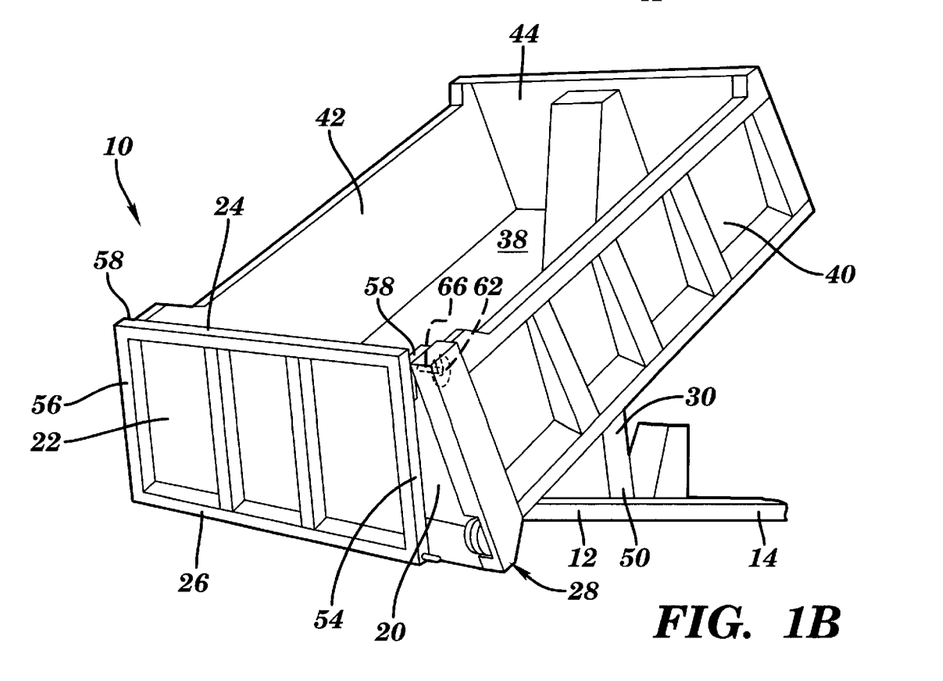
FIG. 1B is another perspective view of the dump truck body on which the automatic rotary tailgate latch operating system is mounted.
Figure 6:
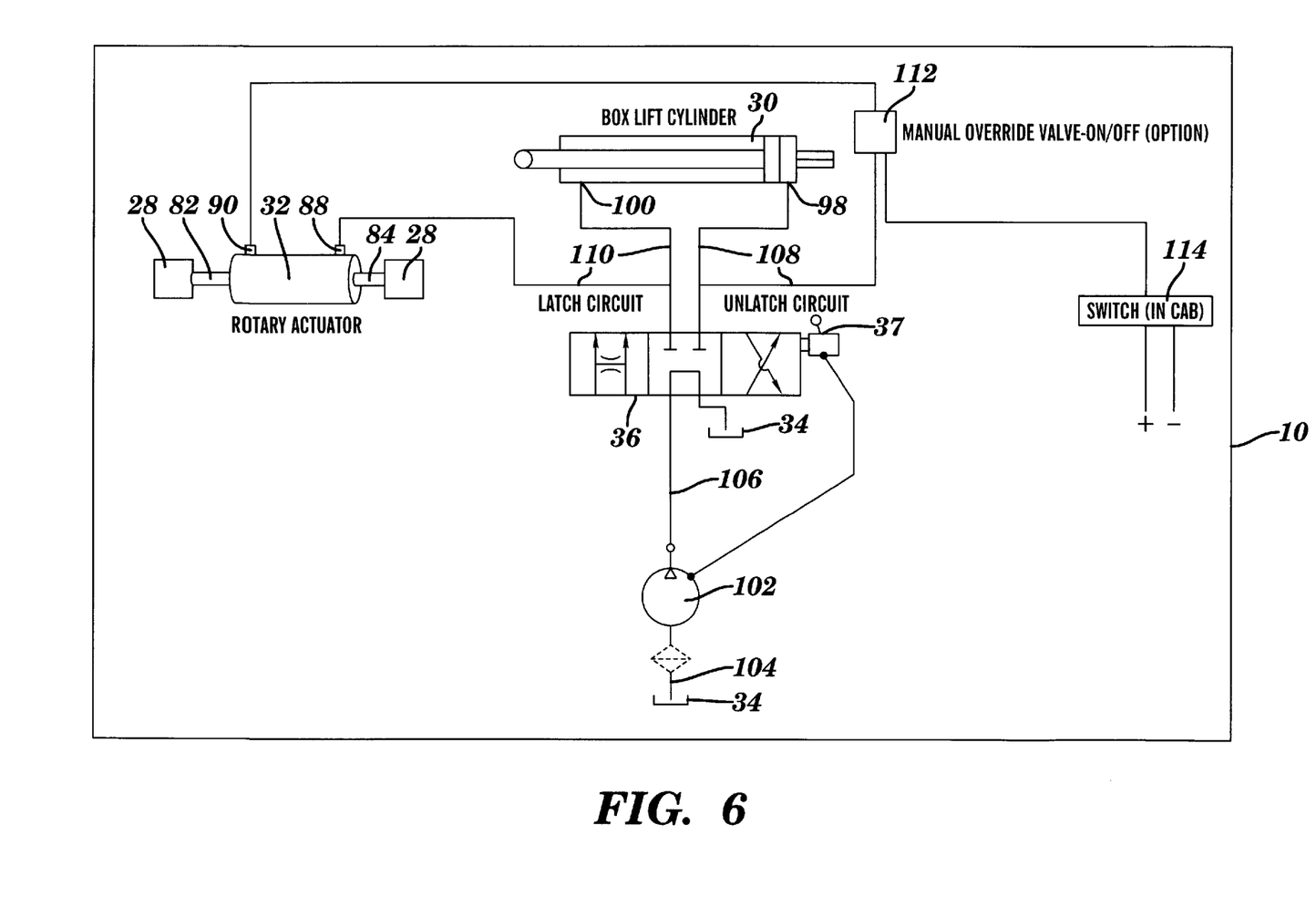
FIG. 6 is a block diagram of one embodiment of the automatic rotary tailgate latch operating system on a double acting lift cylinder.

A vehicle 10 with a rotary tailgate latch operating system in accordance with one embodiment of the present invention is illustrated in FIGS. 1A, 1B, and 6. The vehicle 10 with the rotary tailgate latch operating system includes a longitudinally extending vehicle frame 12 having a pair of opposing longitudinal ends 14 and 16, a vehicle body 18 having a tailgate opening 20, a tailgate 22 having an upper end 24 and a lower end 26, at least one latching mechanism 28 connected to the body 18 adjacent to the lower end 26 of the tailgate 22, a lift cylinder 30 for raising and lowering the vehicle body 18, a rotary actuator 32, and a fluid operating control system including a reservoir 34, a valve 36, and controller 37. The vehicle 10 with the automatic rotary tailgate operating assembly provides a number of advantages including providing a simplified and less expensive automated design for controlling when the lower end 26 of a tailgate 22 is secured and released and utilizing the same fluid operating control system which is used to control the lift cylinder 30 to control the operation of the latching mechanism 28.

Figure 2:
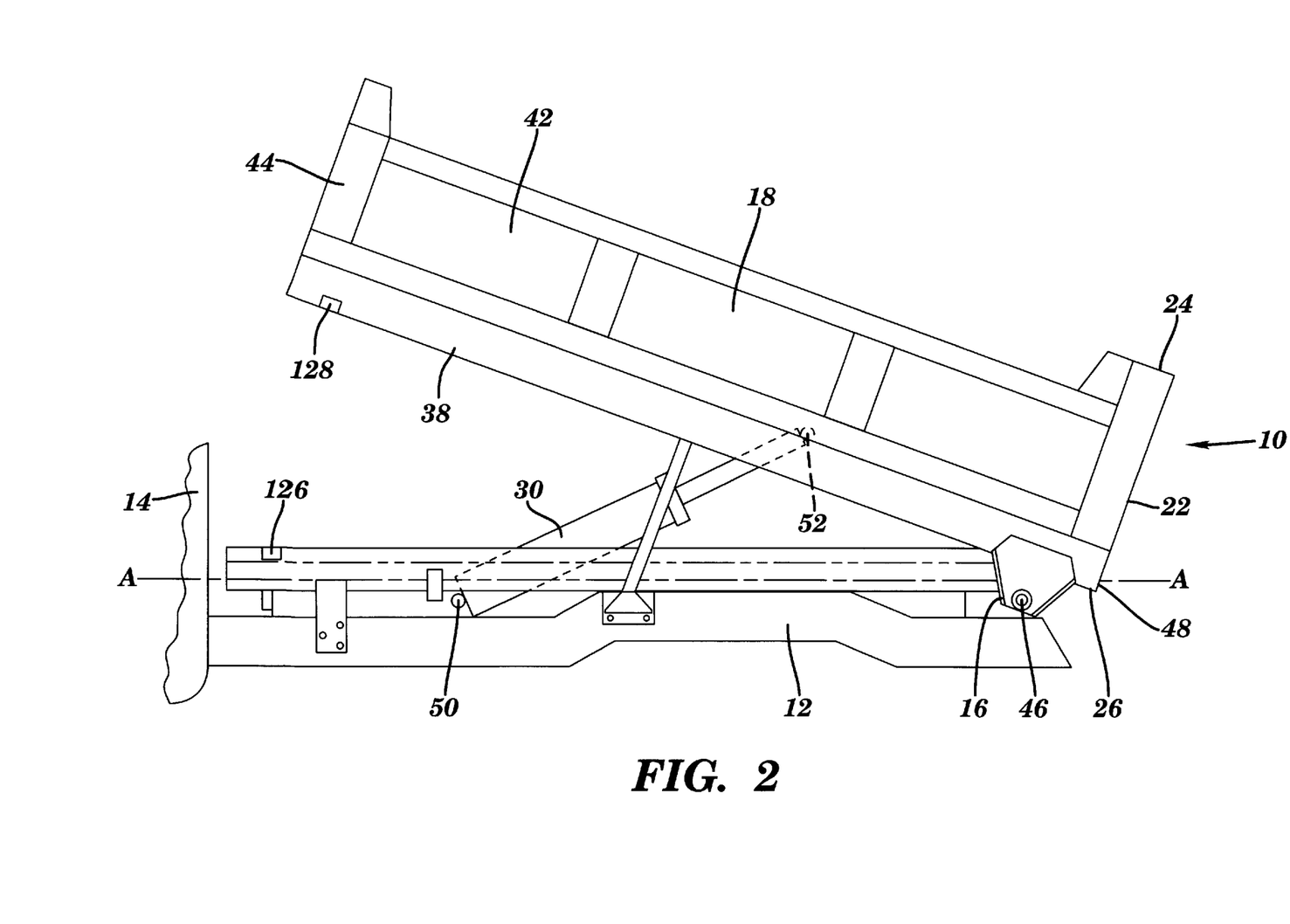
FIG. 2 is a side view of the automatic rotary tailgate latch operating system on a dump truck body.

Referring to FIGS. 1A, 1B, and 2 one embodiment of the rotary tailgate latch operating system on a vehicle 10 is illustrated. Although in this particular embodiment the vehicle 10 is a dump truck with a truck body, the automatic rotary tailgate operating assembly can be mounted on any type of vehicle 10 with a pivotally connected tailgate 22, such as a pick-up truck.

The vehicle 10 includes the vehicle frame 12 which extend along a longitudinal axis A—A and has the pair of opposing longitudinal ends 14 and 16 and the truck body 18. The truck body 18 in this particular embodiment includes a floor 38, a pair of longitudinally extending side walls 40 and 42, a front wall 44, and tailgate opening 20 which are connected together to form a receptacle to transport materials. A pivotal connection connects one end 48 of the truck body 18 adjacent to one of the longitudinal ends 16 of the vehicle frame 12. The truck body 18 can be raised up off of the vehicle frame 12 and can be lowered to rest on or adjacent to the vehicle frame 12 about the pivotal connection 46.

A lift cylinder 30 has one end 50 connected to the vehicle frame 12 adjacent the other longitudinal end 16 of the vehicle frame 12 and has another end 52 connected to the truck body 18. The lift cylinder 30 can be extended to raise the truck body 18 off of or to lower the truck body 18 to rest on or be adjacent to the vehicle frame 12 about the pivotal connection 46. Any type of lift cylinder 30 may be used, such as a double acting lift cylinder or a single acting lift cylinder. A fluid operating control system for controlling the operation of the lift cylinder 30 is discussed below with reference to FIGS. 6 and 7.

Figure 3:
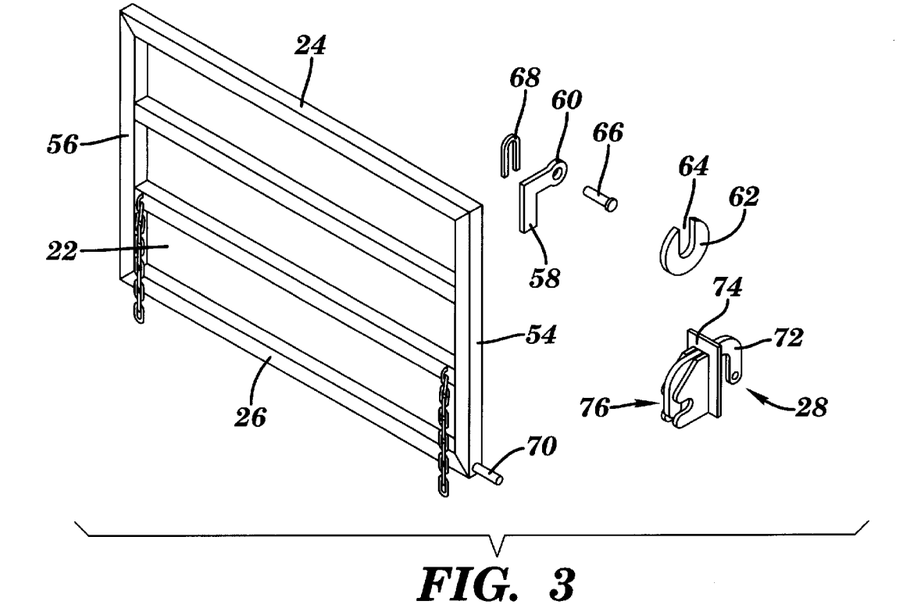
FIG. 3 is an exploded view of the tailgate and tailgate latch for the dump truck body.

Referring to FIGS. 1B and 3, the tailgate 22 includes the upper end 24, the lower end 26, and a pair of sides 54 and 56. The upper end 24 of the tailgate 22 is pivotally connected to the side walls 40 and 42 of the truck body 18 adjacent the tailgate opening 20. In this particular embodiment an L-shaped bracket 58 with an opening 60 at one end of the bracket 58 is attached to each of the opposing sides 54 and 56 of the tailgate 22 adjacent the upper end 24. A flange 62 with an opening 64 is mounted on each of the side walls 40 and 42 adjacent the tailgate opening 20. A pin 66 is passed through the opening in each L-shaped bracket 58 and the flange 62 and is held in place by a retaining clip 68 on each side of the tailgate 22 to pivotally connect the upper end 24 of the tailgate 22 to the truck body 18. Although one type of pivotal connection is shown, other pivotal connections can be used as needed or desired.

In this particular embodiment, each latching mechanism 28 on each side of the tailgate 22 includes a rod 70, a latch 72, and a latch bracket 74. Each rod 70 extends out from one of the sides 54 or 56 of the tailgate 22 adjacent to the lower end 26 in a substantially lateral direction with respect to the longitudinally extending vehicle frame 12. Each latch bracket 74 is secured to one of the side walls 40 or 42 of the truck body 18 adjacent the lower end 26 of the tailgate 22 and includes a slot 76 to receive one of the rods 70. One latch 72 is rotatably connected in each latch bracket 74. When the rods 70 are in the slots 76 in the latch brackets 74 on their respective sides of the tailgate 22, the latches 72 can be rotated to a position securing the rods 70 in the slots 76 in the latch brackets 74 and thus securing the lower end 26 of the tailgate 22 against the truck body 18 in the tailgate opening 20 and to a position releasing the rods 70 from the slots 76 in the latch brackets 74 and thus releasing the lower end 26 of the tailgate 22 so that the tailgate 22 can pivot about the pivotal connections at the upper end 24 of the tailgate 22.

Figure 4:
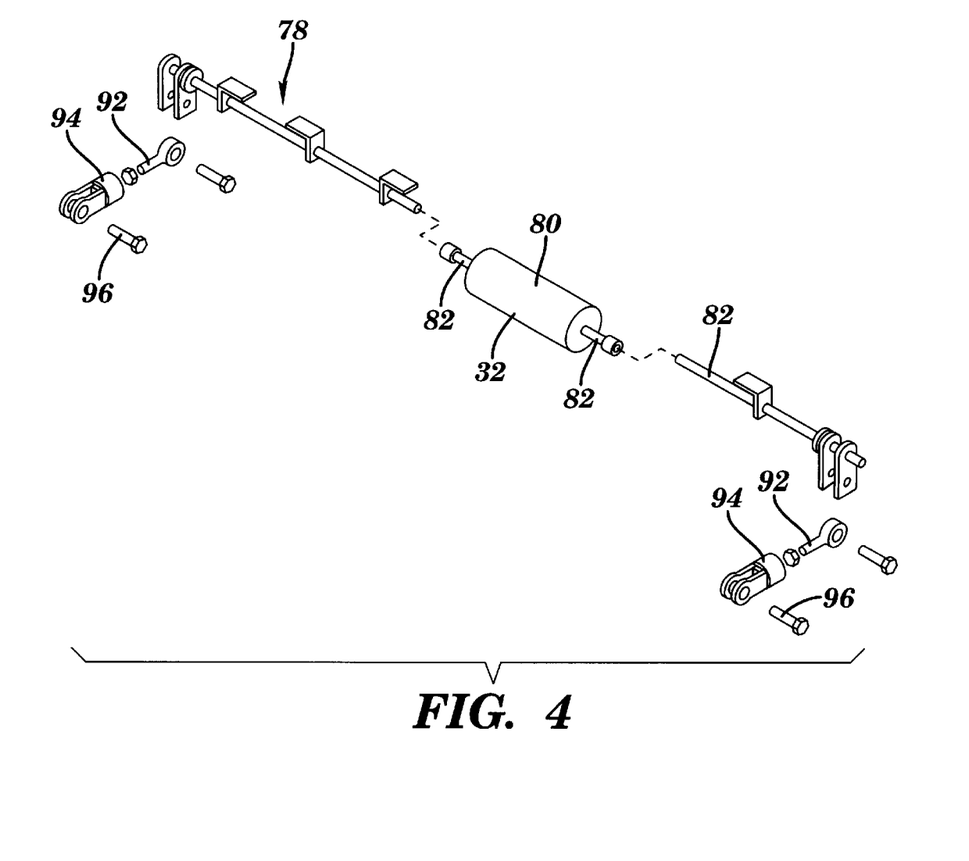
FIG. 4 is an exploded perspective view of a portion of one embodiment of the automatic rotary tailgate latch operating system.

Referring to FIGS. 1 and 4, one embodiment of the rotary actuator 32 and connecting linkage 78 are illustrated. The rotary actuator 32 includes an actuator chamber 80 and a shaft or cross bar 82 rotatably mounted in and extending through opposing sides of the actuator chamber 80. The shaft 82 includes at least one vane (not shown) positioned in the actuator chamber 80 which is used to rotate the shaft 82 in a clockwise and counter clockwise direction. Stops (not shown) are located in the actuator chamber 80 which restrict how far the vane 84 on the shaft 82 can rotate in either direction. The actuator chamber 80 includes a pair of ports 88 and 90 on opposing sides of the vane in the actuator chamber 80. The ports 88 and 90 receive and discharge motive fluid, such as air, water, or oil, into and out of the actuator chamber 80. The motive fluid is used to drive the vanes on the shaft 82 to rotate in either a clockwise or counterclockwise direction. The rotary actuator 32 with the shaft 82 is mounted to the vehicle 10 between the latching mechanisms 28 on each side of the tailgate 22 and extends in a substantially lateral direction with respect to the longitudinally extending truck frame 18. In this particular embodiment, the rotary actuator 32 is mounted to the vehicle body 18 adjacent the tailgate opening 20, although the rotary actuator 32 could be mounted in other locations, such as adjacent the front wall 44 of the body 18 or to the vehicle frame 12. Additionally, although in this particular embodiment a rotary actuator 32 is shown, any type of single actuator, such as a hydraulic cylinder, could be used (although the hydraulic cylinder will have higher maintenance costs than the rotary actuator 32).

Figure 5:
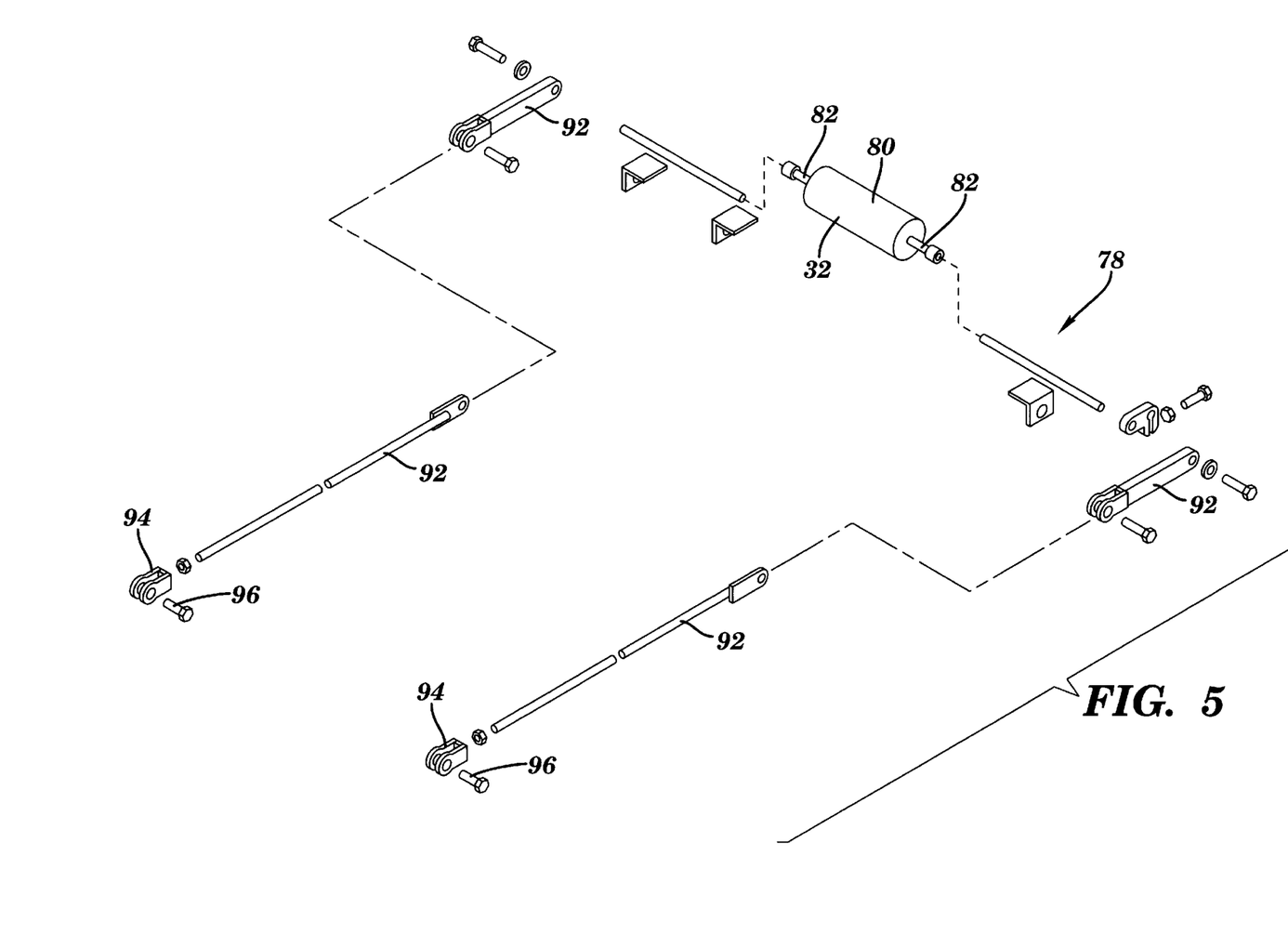
FIG. 5 is an exploded perspective view of a portion of another embodiment of the automatic rotary tailgate latch operating system.

In this particular embodiment, the linkage 78 includes links 92 which are connected at one end to the ends of the shaft or cross bar 82 and at the other end are connected to a clevis 94. The clevis 94 on each side is connected to the latch 72 by a pin 96. When the shaft 82 is rotated by the rotary actuator 32, the shaft 82 rotates the latches 72 on each side to either a latched or unlatched position. As shown in FIG. 5, if the rotary actuator 32 is located closer to the front wall 44 of the vehicle body 18, then longer links 92 are used.

Referring to FIG. 6, a block diagram of one embodiment of the rotary tailgate latch operating system mounted on a vehicle 10 is illustrated. In this particular embodiment, the lift cylinder 30 is a double acting lift cylinder with a pair of ports 98 and 100 which receive and discharge motive fluid from the lift cylinder 30 to raise or extend and lower or retract the lift cylinder 30. The system includes a reservoir 34 which holds the motive fluid for the system which is used to drive the rotary actuator 32 and the lift cylinder 30. For ease of illustration only, the reservoir 34 is illustrated in two different locations in this example but is the same reservoir 34. The reservoir 34 is connected to a pump 102 by pipes 104. The pump 102 is operated under the same control system used to operate the lift cylinder 30 in a manner well known to those of ordinary skill in the art. The pump 102 is connected by pipes 106 to a valve 36 which in this particular embodiment is a two-way valve. One way of the valve 36 is connected by pipes 108 to one port 98 of the lift cylinder 30 and one port 90 of the rotary actuator 32 to pump motive fluid into the lift cylinder 30 to extend the lift cylinder 30 and to rotate the rotary actuator 32 to release the rods 70 from the latches 72 on each side of the vehicle body 18. The other way of the valve 36 is connected by pipes 110 to the other port 100 of the lift cylinder 30 and the other port 88 of the rotary actuator 32 to pump motive fluid into the lift cylinder 30 to retract the lift cylinder 30 and to rotate the rotary actuator 32 to secure the rods 70 with the latches 72 on each side of the vehicle body 18.

The control system for the lift cylinder 30 and the rotary actuator 32 includes controller 37 which is located on the vehicle, typically the cab of the vehicle. The controller 37 is coupled to the valve 36 and is used to control which way the valve 36 is opened. The controller 37 is also coupled to the pump 102 to control when the pump 102 is turned on to pump motive fluid from the reservoir 34. Basically, when the controller 37 is engaged, a signal is sent to valve 36 to open one way or the other way and for the pump 102 to start or stop pumping fluid.

This embodiment may also include a manual override valve 112 connected between the rotary actuator 32 and the valve 36. An override switch 114 is coupled to the valve 112 and is typically located in the cab of the vehicle 10 to control when the manual override valve 112 is opened and closed. With the manual override valve 112, the tailgate 22 can remain latched even if the vehicle body 18 is lifted off of the vehicle frame 12 about the pivotal connection 46.

The operation of this embodiment of the rotary tailgate latch operating system on a vehicle 10 is discussed with reference to FIGS. 1A, 1B, 2, and 6. Assuming the vehicle body 18 is resting on the vehicle frame 12 and the latches 72 and rods 70 are securing the lower end 26 of the tailgate 22 against the vehicle body 18. When the operator of the vehicle 10 engages the controller 37 to raise the vehicle body 18, the pump 102 is signaled to begin pumping motive fluid from reservoir 34 to the valve 36. One way of the valve 36 is connected to direct motive fluid to one port 98 of the lift cylinder 30 which causes the lift cylinder 30 to extend and raise the vehicle body 18 off of the vehicle frame 12 about the pivotal connection 46 and to one port 90 of the rotary actuator 32 to rotate the shaft 82. Rotating the shaft 82 rotates the latches 72 to release the rods 70 from the slots 76 on each side of the tailgate 22 and permits the tailgate 22 to pivot about the pivotal connections adjacent the upper end 24 of the tailgate 22. Meanwhile, motive fluid from the other port 100 of the lift cylinder 30 and the other port 88 of the rotary actuator 32 is directed back via the other way of the valve 36 to the reservoir 34. The manual override valve 112 between the one way from the valve 36 and the port 90 of rotary actuator 32 is normally open. If the operator closes the override switch 114, the manual override valve 112 is closed and motive fluid does not reach the rotary actuator 32. As a result, the latches 72 secure the rods 70 and hold the lower end 26 of the tailgate 22 against the vehicle body 18 even as the vehicle body 18 is being raised off of the vehicle frame 18.

When the operator of the vehicle engages the controller 37 to lower the vehicle body 18, the pump 102 pumps motive fluid to the other way of the valve 36. The other way of the valve 36 directs motive fluid to the other port 100 of the lift cylinder 30 to drive the lift cylinder 30 to retract and lower the vehicle body 18 to rest on or adjacent to the vehicle frame 12 about the pivotal connection 46. When the lift cylinder 30 is fully retracted, then the pressure builds up enough to shift motive fluid to the other port 88 of the rotary actuator 32 to rotate the shaft 82 in the opposing direction. Rotating the shaft 82 rotates the latches 72 to secure the rods 70 in the slots 76 and secures the lower end 26 of the tailgate 22 against the vehicle body 18. Meanwhile, motive fluid from the one port 98 of the lift cylinder 30 and eventually from the one port 90 of the rotary actuator 32 (when the lift cylinder is fully retracted) is directed back via the one way of the valve 36 to the reservoir 34.

One of advantages of this system is that only a single actuator is needed to latch and unlatch the latching mechanisms 28. As a result, this design is much simpler and less expensive than prior designs. Another advantage of this system is that the same motive fluid operating control system is used to operate the lift cylinder 30 and the rotary actuator 32. This also simplifies and reduces the cost of this design as compared to prior designs.

Figure 7:
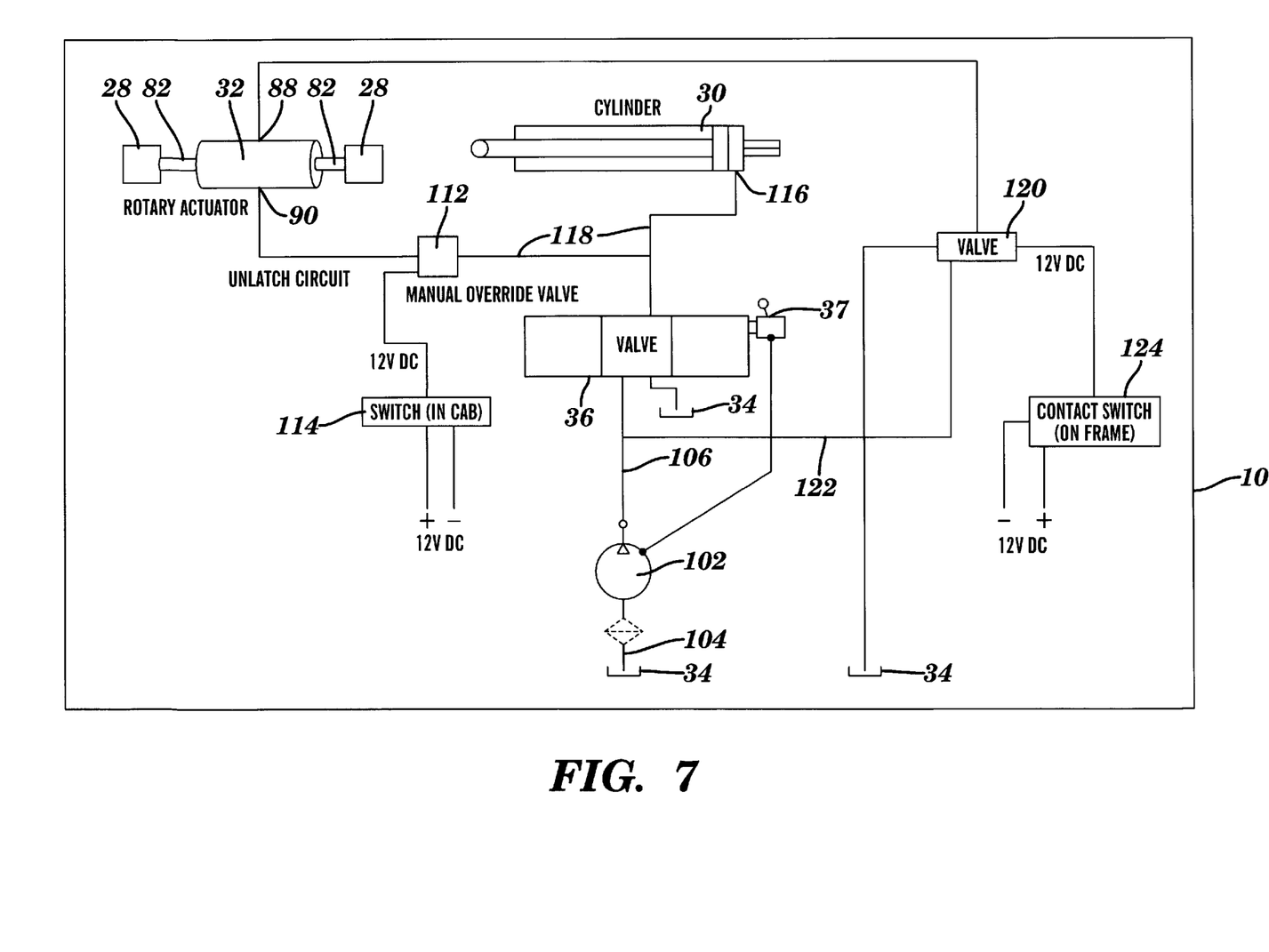
FIG. 7 is a block diagram of another embodiment of the automatic rotary tailgate latch operating system on a single acting lift cylinder.

Referring to FIG. 7, a block diagram of another embodiment of the rotary tailgate latch operating system mounted on a vehicle 10 is illustrated. In this particular embodiment, the lift cylinder 30 is a single acting lift cylinder with a single port 116 which receives and discharges motive fluid from the lift cylinder 30 to raise or extend and lower or retract the lift cylinder 30. As with the previous embodiment, this system includes a reservoir 34 which holds the motive fluid for the system which is used to drive the lift cylinder 30 and the rotary actuator 32. For ease of illustration only, the reservoir 34 is illustrated in three different locations in this example, but is the same reservoir 34. The reservoir 34 is connected to a pump 102 by pipes 104. The pump 102 is operated under the same control system used to operate the lift cylinder 30 in a manner well known to those of ordinary skill in the art. The pump 102 is connected by pipes 106 valve 36 which is connected by pipes 118 to the one port 116 of the lift cylinder 30 and to one of the ports 90 for the rotary actuator 32. The pump 102 is also coupled to another valve 120 by pipes 122 which are connected to the other port 88 of the rotary actuator 32. A contact switch 124, like the one illustrated in FIG. 2, has a pair of contact terminals 126 and 128 coupled to the valve 120 with one contact terminal 128 located on the vehicle body 18 and the other contact terminal 126 located on the vehicle frame 12. When the vehicle body 18 is resting on or adjacent to the vehicle frame 18, the contact terminals 126 and 128 are brought into electrical contact to close the contact switch 124.

This embodiment may also include a manual override valve 112 connected between the port 90 of rotary actuator 32 and the valve 120. An override switch 114 is coupled to the valve 112 and is typically located in the cab of the vehicle 10 to control when the manual override valve 112 is opened and closed. With the manual override valve 112, the tailgate 22 can remain latched even if the vehicle body 18 is lifted off of the vehicle frame 12 about the pivotal connection 46.

The operation of this embodiment of the rotary tailgate latch operating system on a vehicle 10 is discussed with reference to FIGS. 1A, 1B, 2, and 7. Assuming the vehicle body 18 is resting on the vehicle frame 12 and the latches 72 are securing the rods 70 and thus the lower end 26 of the tailgate 22 against the vehicle body 18. When the operator of the vehicle 10 engages the controller 37 to raise the vehicle body 18, the pump 102 is signaled to begin pumping motive fluid from reservoir 34 to the valve 36. The valve 36 is switched to direct motive fluid from the pump 102 to the one port 116 of the lift cylinder 30 which causes the lift cylinder 30 to extend and raise the vehicle body 18 off of the vehicle frame 12 about the pivotal connection 46 and to one port 90 of the rotary actuator 32 to rotate the shaft 82. Rotating the shaft 82 rotates the latches 72 to release the rods 70 from the slots 76 and the lower end 26 of the tailgate 22 from the vehicle body 18 permitting the tailgate 22 to pivot about the pivotal connections adjacent the upper end 24 of the tailgate 22. Meanwhile, motive fluid from the other port 88 of the rotary actuator 32 is directed back via the valve 120 to the reservoir 34. The manual override valve 112 between the valve 36 and the port 90 of rotary actuator 32 is normally open. If the operator closes the override switch 114, the manual override valve 112 is closed and motive fluid does not reach the rotary actuator 32. As a result, the latches 72 secure the rods 70 and hold the lower end 26 of the tailgate 22 against the vehicle body 18 even as the vehicle body 18 is being raised off of the vehicle frame 12.

When the operator of the vehicle 10 engages the controller 37 to lower the vehicle body 18, the valve 36 is switched to permit motive fluid to drain back into the reservoir 34 as the vehicle body 18 floats down to rest on or adjacent to the vehicle frame 12. When the vehicle body 18 rests on or adjacent to the vehicle frame 12, the contact terminals 126 and 128 of the contact switch 124 are closed to make an electrical connection which switches the valve 120 and permits motive fluid to be pumped by the pump 102 to the other port 88 of the rotary actuator 32. The motive fluid in the other port 88 rotates the shaft 82 which rotates the latches 72 to secure the rods 70 in the slots 76 and secures the lower end 26 of the tailgate 22 against the vehicle body 18. Meanwhile, motive fluid from the one port 90 of the rotary actuator 32 is directed back via the valve 36 to the reservoir 34.

Again, one of advantages of this system is that only a single actuator is needed to latch and unlatch the latching mechanisms. As a result, this design is much simpler and less expensive than prior designs. Additionally, the same motive fluid operating control system is used to operate the lift cylinder 30 is used to operate the rotary actuator 32. This also simplifies and reduces the cost of this design as compared to prior designs.

Figure 8:
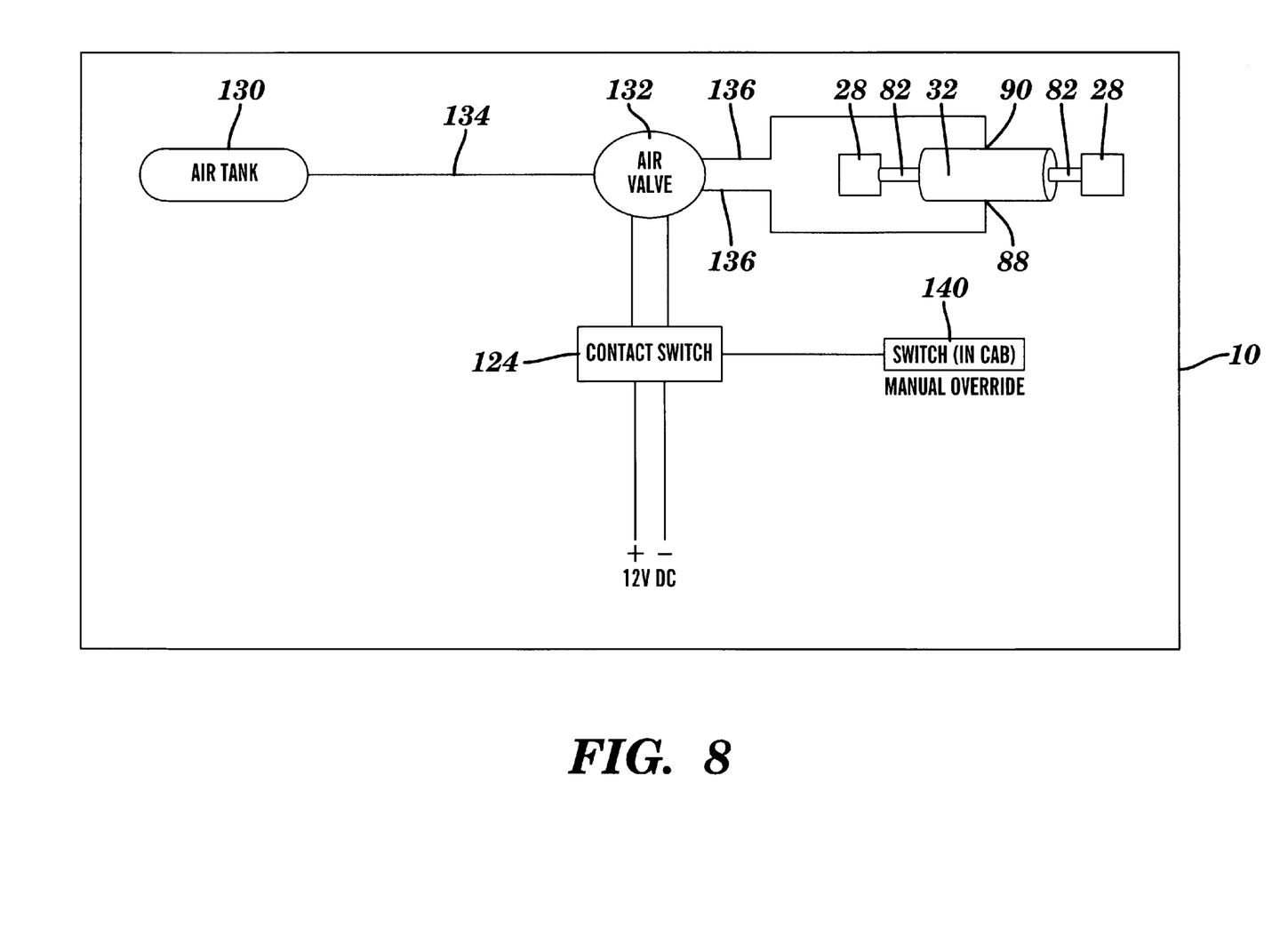
FIG. 8 is a block diagram of another embodiment of the automatic rotary tailgate latch operating system.

Referring FIG. 8, a block diagram of another embodiment of the automatic rotary tailgate latch operating system mounted on a vehicle 10 is illustrated. This system includes a reservoir 130 which holds the motive fluid for the system that is used to control the rotary actuator 32. In this particular embodiment, the reservoir 130 is a tank of pressurized air, although other types of reservoirs and motive fluids can be used as needed or desired. The reservoir 130 is connected to a valve 132 by pipe 134 and the valve 132 is connected by pipes 136 and 138 to the ports 88 and 90 for the rotary actuator 32. A contact switch 124, like the one illustrated in FIG. 2, has a pair of contact terminals 126 and 128 coupled to the valve 132 with one contact terminal 128 located on the vehicle body 18 and the other contact terminal 126 located on the vehicle frame 12. When the vehicle body 18 is resting on or adjacent to the vehicle frame 12, the contact terminals 126 and 128 are brought into electrical contact to close the switch 124. A manual override switch 140 may be coupled to the contact switch 124 which closes the electrical connection even when the contact switch 124 is open.

The operation of this embodiment of the automatic rotary tailgate latch operating system on a vehicle 10 is discussed with reference to FIGS. 1A, 1B, 2, and 8. Assuming the vehicle body 18 is resting on the vehicle frame 12 and the latches 72 are securing the lower end 26 of the tailgate 22 against the vehicle body 18. When the operator of the vehicle 10 begins to raise the vehicle body 18, the contact terminals 126 and 128 are separated opening the contact switch 124. When the contact switch 124 is opened the valve 132 is direct signaled to motive fluid, in this example pressurized air, to one port 90 of the rotary actuator 32 which rotates the shaft 82. Rotating the shaft 82 rotates the latches 72 to release the rods 70 from the slots 76 and the lower end 26 of the tailgate 22 from the vehicle body 18 permitting the tailgate 22 to pivot about the pivotal connections adjacent the upper end 24 of the tailgate 22. Meanwhile, motive fluid from the other port 88 of the rotary actuator 32 is released via the valve 138 back to or to the atmosphere. If the operator closes the override switch 140, the valve 32 does not permit motive fluid to reach the one port 90 of the rotary actuator 32. As a result, the latches 72 secure the rods 70 and hold the lower end 26 of the tailgate 22 against the vehicle body 18 even as the vehicle body 18 is being raised.

When the vehicle body 18 has been lowered to rest on or adjacent to the vehicle frame 12, the contact terminals 126 and 128 of the contact switch 124 are closed which signals the valve 132 to switch and permits motive fluid to be pumped by the pump to the other port 88 of the rotary actuator 32. The motive fluid rotates the shaft 82 which rotates the latches 72 to secure the rods 70 in the slots 76 and secures the lower end 26 of the tailgate 22 against the vehicle body 18. Meanwhile, valve 132 permits motive fluid from port 90 of rotary actuator 32 to be released to the atmosphere.

Figure 9:
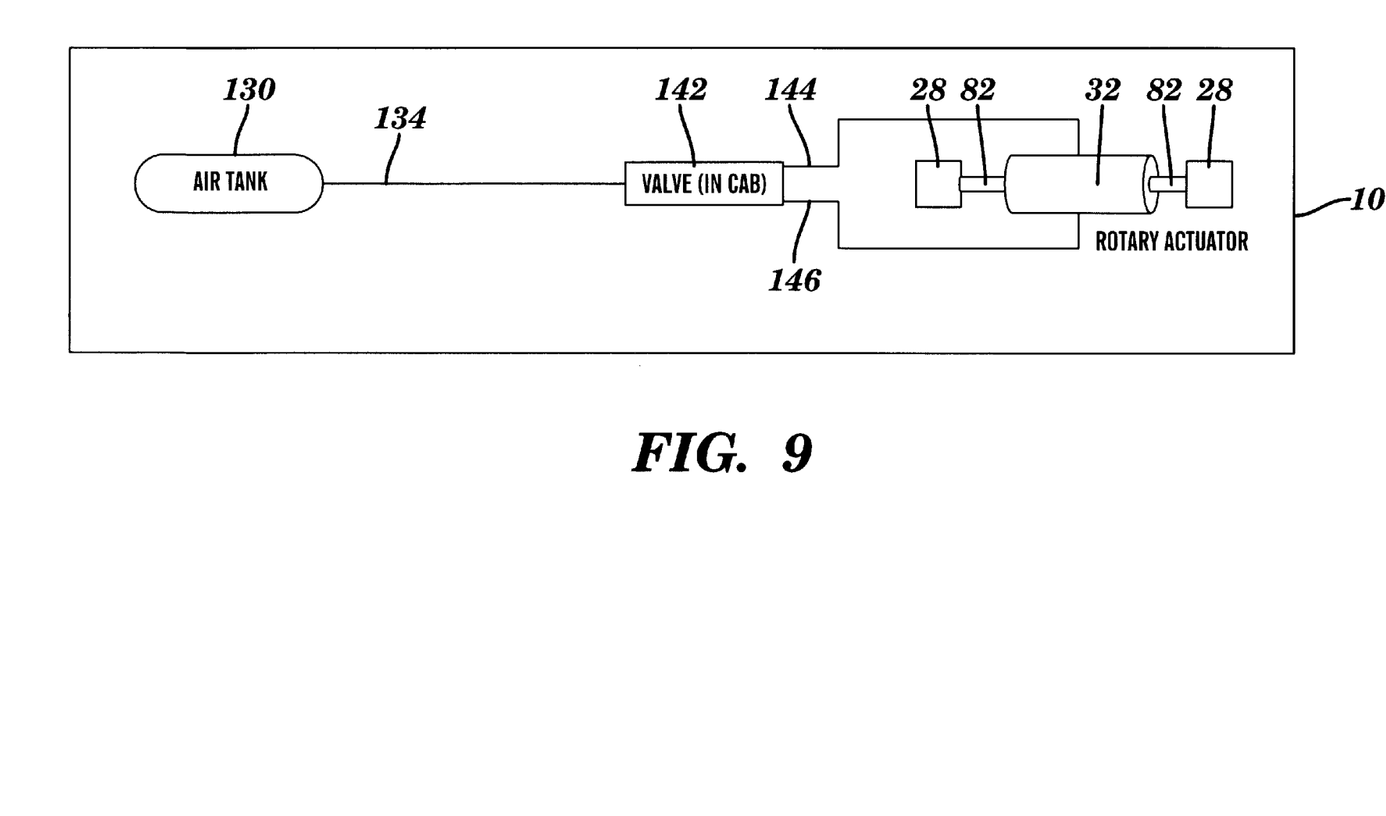
FIG. 9 is another embodiment of the automatic rotary tailgate latch operating system.

Referring FIG. 9, a block diagram of another embodiment of the rotary tailgate latch operating system is mounted on a vehicle 10 is illustrated. This system includes a reservoir 130 which holds the motive fluid for the system that is used to control the rotary actuator 32. In this particular embodiment, the reservoir 130 is a tank of pressurized air, although other types of reservoirs and motive fluids can be used as needed or desired. The reservoir 130 is connected to a valve 142 by pipes 134 and the valve 142 is connected by pipes 144 and 146 to the ports 88 and 90 for the rotary actuator 32.

The operation of this embodiment of the rotary tailgate latch operating system on a vehicle 10 is discussed with reference to FIGS. 1A, 1B, 2, and 9. When the operator switches the valve 142 to direct motive fluid, in this example pressurized air, to one port 90 of the rotary actuator 32, the motive fluid rotates the shaft 82. Rotating the shaft 82 rotates the latches 72 to release the rods 70 from the slots 76 and the lower end 26 of the tailgate 22 from the vehicle body 18 permitting the tailgate 22 to pivot about the pivotal connections 24 adjacent the upper end of the tailgate 22. Meanwhile, motive fluid from the other port 80 of the rotary actuator 32 is released via the valve 142 back to the atmosphere.

When the vehicle body 18 is lowered to rest on or adjacent to the vehicle frame 12, the operator of the vehicle switches the valve 142 which directs motive fluid to the other port 88 of the rotary actuator 32. The motive fluid in the other port 88 rotates the shaft 82 which rotates the latches 72 to secure the rods 70 in the slots 76 and secures the lower end 26 of the tailgate 22 against the vehicle body 18. Meanwhile, motive fluid from the other port 90 of the rotary actuator 32 is released to the atmosphere via valve 142.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A vehicle with a tailgate latching control system comprising:
   a longitudinally extending vehicle frame having a pair of opposing longitudinal ends;
   a vehicle body having a tailgate opening, the vehicle body connected to the vehicle frame;
   a tailgate having an upper end and a lower end, the tailgate pivotally connected to the vehicle body in the tailgate opening;
   at least one latching mechanism connected to the body adjacent to the lower end of the tailgate, the latching mechanism having a first position which secures the lower end of the tailgate adjacent to the body and a second position which releases the lower end of the tailgate;

a lift cylinder for raising and lowering the vehicle body, the lift cylinder having a pair of opposing ends with one of the ends of the lift cylinder connected to the vehicle frame and the other end of the lift cylinder connected to the vehicle body;

a rotary actuator connected to the latching mechanism for rotating the latching mechanism between the first and second positions when engaged; and a fluid operating control system connected to operate both the lift cylinder and the rotary actuator.

2. The vehicle with the tailgate latching control system as set forth in claim 1 further comprising another latching mechanism wherein the latching mechanisms are connected to opposite sides of the vehicle body adjacent to the lower end of the tailgate and the rotary actuator is connected to both of the latching mechanisms for rotating them between the first and second positions.

3. The vehicle with the tailgate latching control system as set forth in claim 1 wherein the fluid operating control system further comprises:

a reservoir of fluid;

a first valve connected between the reservoir and the lift cylinder and the rotary actuator; and a controller located in the vehicle and coupled to the first valve to control the operation of the first valve.

4. The vehicle with the tailgate latching control system as set forth in claim 3 wherein the fluid is air.

5. The vehicle with the tailgate latching control system as set forth in claim 3 wherein the fluid operating control system further comprises a pump connected between the first valve and the reservoir.

6. The vehicle with the tailgate latching control system as set forth in claim 5 wherein the first valve is a two-way valve, one of the ways of the two way valve is connected adjacent to one of the ends of the lift cylinder to permit fluid to be pumped in to retract the lift cylinder and lower the vehicle body to the vehicle frame and is connected to the rotary actuator to permit fluid to be pumped in to the rotary actuator to rotate the latching mechanism to the first position and the other way of the two way valve is connected adjacent to the other end of the lift cylinder to permit fluid to be pumped in to extend the lift cylinder and raise the vehicle body off of the vehicle frame and is connected to the rotary actuator to permit fluid to be pumped in to rotate the rotary actuator to rotate the latching mechanism to the second position.

7. The vehicle with the tailgate latching control system as set forth in claim 5 further comprising:

a manual override valve connected between the pump and the rotary actuator; and a manual override control system located in the vehicle and coupled to the manual override valve to control the opening and closing of the manual override valve and the operation of the rotary actuator.

8. The vehicle with the tailgate latching control system as set forth in claim 5 wherein the fluid operating control system further comprises:

a second valve connected between the pump and the rotary actuator;

a contact switch with a pair of contact terminals, one of the contact terminals connected to the vehicle frame and the other contact terminal connected to the vehicle body;

a contact switch controller in the vehicle coupled to the contact terminals, the contact switch controller closing the second valve when an electrical connection between the contact terminals is broken when the vehicle body is raised off of the vehicle frame and opening the second valve when the electrical connection between the contact terminals is completed when the vehicle body rests adjacent to the vehicle frame.

9. The vehicle with the tailgate latching control system as set forth in claim 8 further comprising:

a manual override valve connected between the first valve and the rotary actuator; and a manual override control system located in the vehicle and coupled to the manual override valve to control the opening and closing of the manual override valve and the operation of the rotary actuator.

10. A vehicle with a tailgate latching control system comprising:

a longitudinally extending vehicle frame having a pair of opposing longitudinal ends;

a vehicle body having a tailgate opening, the vehicle body connected to the vehicle frame;

a lift cylinder for raising and lowering the vehicle body, the lift cylinder having a pair of opposing ends with one of the ends of the lift cylinder connected to the vehicle frame and the other end of the lift cylinder connected to the vehicle body;

a tailgate having an upper end and a lower end, the tailgate pivotally connected to the vehicle body in the tailgate opening;

a pair of latching mechanisms connected to each side of the body adjacent to the lower end of the tailgate, each of the latching mechanisms having a first position which secures that side of the lower end of the tailgate adjacent to the body and a second position which releases that side of the lower end of the tailgate;

a single actuator connected to both of the latching mechanisms for simultaneously moving each of the latching mechanisms between the first and second positions; and a control system connected to operate the single actuator, wherein the control system comprises a reservoir of fluid, a first valve connected between the reservoir and the lift cylinder and the single actuator, and a controller located in the vehicle and coupled to the first valve to control the operation of the first valve.

11. The vehicle with the tailgate latching control system as set forth in claim 10 wherein the control system further comprises a pump connected between the first valve and the reservoir.

12. The vehicle with the tailgate latching control system as set forth in claim 10 wherein the single actuator is a rotary actuator.

13. The vehicle with the tailgate latching control system as set forth in claim 11 wherein the control system further comprises:

a second valve connected between the pump and the actuator;

a contact switch with a pair of contact terminals, one of the contact terminals connected to the vehicle frame and the other contact terminal connected to the vehicle body;

a contact switch controller in the vehicle coupled to the contact terminals, the contact switch controller closing the second valve when an electrical connection between the contact terminals is broken when the vehicle body is raised off of the vehicle frame and opening the second valve when the electrical connection between the contact terminals is completed when the vehicle body rests adjacent to the vehicle frame.

14. The vehicle with the tailgate latching control system as set forth in claim 13 further comprising:
- a manual override valve connected between the first valve and the actuator; and
- a manual override control system located in the vehicle and coupled to the manual override valve to control the opening and closing of the manual override valve and the operation of the actuator.

15. The vehicle with the tailgate latching control system as set forth in claim 10 wherein the single actuator extends in a substantially lateral direction with respect to the longitudinally extending vehicle frame.

16. The vehicle with the tailgate latching control system as set forth in claim 11 wherein the first valve is a two-way valve, one of the ways of the two way valve is connected adjacent to one of the ends of the lift cylinder to permit fluid to be pumped in to retract the lift cylinder and lower the vehicle body to the vehicle frame and is connected to the actuator to permit fluid to be pumped in to the actuator to rotate the latching mechanism to the first position and the other way of the two way valve is connected adjacent to the other end of the lift cylinder to permit fluid to be pumped in to extend the lift cylinder and raise the vehicle body off of the vehicle frame and is connected to the actuator to permit fluid to be pumped in to rotate the actuator to rotate the latching mechanism to the second position.

17. The vehicle with the tailgate latching control system as set forth in claim 11 further comprising:
- a manual override valve connected between the pump and the actuator; and
- a manual override control system located in the vehicle and coupled to the manual override valve to control the opening and closing of the manual override valve and the operation of the actuator.

18. A tailgate latching control system for a vehicle with a longitudinally extending vehicle frame having a pair of opposing longitudinal ends, a vehicle body having a tailgate opening, the vehicle body connected to the frame, a tailgate having an upper end and a lower end, the tailgate pivotally connected to the vehicle body in the tailgate opening, the tailgate latching control system comprising:
- at least one latching mechanism connected to the body adjacent to the lower end of the tailgate, the latching mechanism having a first position which secures the lower end of the tailgate adjacent to the body and a second position which releases the lower end of the tailgate;
- a rotary actuator connected to the latching mechanism, the rotary actuator rotating the latching mechanism between the first and second positions when engaged; and
- a fluid operating control system connected to the rotary actuator to control the operation of the rotary actuator, the fluid operating control system comprising a reservoir of fluid, a first valve connected between the reservoir and the rotary actuator a pump connected between the first valve and the reservoir, and a controller located in the vehicle and coupled to the first valve to control the operation of the first valve;
- a manual override valve connected between the pump and the rotary actuator; and
- a manual override control system located in the vehicle and coupled to the manual override valve to control the opening and closing of the manual override valve and the operation of the rotary actuator.

19. The tailgate latching control system as set forth in claim 18 further comprising another latching mechanism wherein the latching mechanisms are connected to opposite sides of the vehicle body adjacent to the lower end of the tailgate and the rotary actuator is connected to both of the latching mechanisms for rotating them between the first and second positions.

20. The tailgate latching control system as set forth in claim 18 wherein the first valve is a two-way valve, one of the ways of the two way valve is connected to the rotary actuator to permit fluid to be pumped in to the rotary actuator to rotate the latching mechanism to the first position and the other way of the two way valve is connected to the rotary actuator to permit fluid to be pumped in to rotate the rotary actuator to rotate the latching mechanism to the second position.

21. The tailgate latching control system as set forth in claim 20 wherein the fluid operating control system further comprises:
- a second valve connected between the pump and the rotary actuator;
- a contact switch with a pair of contact terminals, one of the contact terminals connected to the vehicle frame and the other contact terminal connected to the vehicle body;
- a contact switch controller in the vehicle coupled to the contact terminals, the contact switch controller closing the second valve when an electrical connection between the contact terminals is broken when the vehicle body is raised off of the vehicle frame and opening the second valve when the electrical connection between the contact terminals is completed when the vehicle body rests adjacent to the vehicle frame.

* * * * *